United States Patent
Ono

(10) Patent No.: US 10,366,312 B2
(45) Date of Patent: Jul. 30, 2019

(54) PATTERN RECOGNITION DEVICE, PATTERN RECOGNITION METHOD, AND COMPUTER PROGRAM PRODUCT

(71) Applicants: KABUSHIKI KAISHA TOSHIBA, Minato-ku, Tokyo (JP); TOSHIBA DIGITAL SOLUTIONS CORPORATION, Kawasaki-shi, Kanagawa (JP)

(72) Inventor: Soichiro Ono, Tachikawa Tokyo (JP)

(73) Assignees: KABUSHIKI KAISHA TOSHIBA, Tokyo (JP); TOSHIBA DIGITAL SOLUTIONS CORPORATION, Kawasaki-Shi (JP)

( * ) Notice: Subject to any disclaimer, the term of this patent is extended or adjusted under 35 U.S.C. 154(b) by 0 days.

(21) Appl. No.: 15/709,771

(22) Filed: Sep. 20, 2017

(65) Prior Publication Data

US 2018/0012108 A1 Jan. 11, 2018

Related U.S. Application Data

(63) Continuation of application No. PCT/JP2015/063531, filed on May 11, 2015.

(51) Int. Cl.
*G06K 9/00* (2006.01)
*G06K 9/62* (2006.01)
(Continued)

(52) U.S. Cl.
CPC .......... *G06K 9/6277* (2013.01); *G06K 9/481* (2013.01); *G06K 9/6212* (2013.01);
(Continued)

(58) Field of Classification Search
None
See application file for complete search history.

(56) References Cited

U.S. PATENT DOCUMENTS

2007/0258644 A1    11/2007    Kawahara et al.

FOREIGN PATENT DOCUMENTS

| JP | 04-305700 | 10/1992 |
| JP | 2001-125593 | 5/2001 |

(Continued)

OTHER PUBLICATIONS

Bishop, "Pattern Recognition and Machine Learning (vol. 1 and vol. 2)" (supervised and translated by Noboru Murata), Springer Japan 2007.

(Continued)

*Primary Examiner* — Soo Jin Park
(74) *Attorney, Agent, or Firm* — Amin, Turocy & Watson LLP

(57) ABSTRACT

According to an embodiment, a pattern recognition device recognizes a pattern of an input signal by converting the input signal to a feature vector and matching the feature vector with a recognition dictionary. The recognition dictionary includes a dictionary subspace basis vector for expressing a dictionary subspace which is a subspace of a space of the feature vector, and a plurality of probability parameters for converting similarity calculated from the feature vector and the dictionary subspace into likelihood. The device includes a recognition unit configured to calculate the similarity using a quadratic polynomial of a value of an inner product of the feature vector and the dictionary subspace basis vector, and calculate the likelihood using the similarity and an exponential function of a linear sum of the probability parameters. The recognition dictionary is trained by using an expectation maximization method using a constraint condition between the probability parameters.

6 Claims, 3 Drawing Sheets

(51) Int. Cl.
  *G10L 15/14* (2006.01)
  *G06K 9/48* (2006.01)
  *G10L 25/03* (2013.01)
  *G10L 25/27* (2013.01)
  *G06N 7/00* (2006.01)

(52) U.S. Cl.
  CPC ......... *G06K 9/6232* (2013.01); *G06K 9/6265* (2013.01); *G06N 7/005* (2013.01); *G10L 15/14* (2013.01); *G10L 25/03* (2013.01); *G10L 25/27* (2013.01)

(56) References Cited

FOREIGN PATENT DOCUMENTS

| | | |
|---|---|---|
| JP | 2007-233873 | 9/2007 |
| JP | 2014-153763 | 8/2014 |

OTHER PUBLICATIONS

Camastra, et al. "Machine Learning for Audio, Image and Video Analysis : Theory and Applications", Springer-Verlag, 2007.
Introduction to Machine Learning for Natural Language Processing (C) Hiroya Takamura 2010.
Park, et al. "Integration of Phoneme-subspaces for Speech Feature Extraction", Information Processing Society memoir vol. 2007 No. 129 2007-SLP-69 spoken language information processing, Information Processing Society of Japan, Dec. 20, 2007, pp. 241-246, ISSN 0919-6072.
Sato, et al. "Examination of the HMM-SM hybrid speech recognition using the likelihood normalization technique", in spring for Acoustical Society of Japan 2002 years, presentation of the results of the study meeting lecture memoirs, mrporate judicial person Japan sound society, Mar. 18, 2002, pp. 87-88, ISSN 1340-3168.
Oja "Pattern Recognition and Subspace Method", (translated by Hidemitsu Ogawa and Makoto Sato) Sangyo Tosho Publishing Co., Ltd., 1986.
Kita "Stochastic Language Model" (Language and Calculation 5), University of Tokyo Press, 1999 ISBN4-13-065404-7.
Kurosawa "Subspace Method Obtained from Gaussian Distribution on a Hyper Spherical Surfact", IEICE (D-2), J81-D2 (6), pp. 1205-1212, 1998.
Rodriguez, et al. "Local Gradient Histogram Features for Word Spotting in Unconstrained Handwritten Documents" Proc. ICFHR2008, 2008.
International Search Report for International Patent Application No. PCT/JP2015/063531 dated Aug. 11, 2015, 1 page.
International Search Report for International Patent Application No. PCT/JP2015/063531 dated Aug. 11, 2015, 3 pages.
Written Opinion for International Patent Application No. PCT/JP2015/063531 dated Aug. 11, 2015, 3 pages.

STATE 1   STATE 2   STATE 3

GMM

STOCHASTIC
SUBSPACE MODEL

PATTERN RECOGNITION DEVICE, PATTERN RECOGNITION METHOD, AND COMPUTER PROGRAM PRODUCT

CROSS-REFERENCE TO RELATED APPLICATIONS

This application is a continuation of PCT international application Ser. No. PCT/JP2015/063531 filed on May 11, 2015 which designates the United States, incorporated herein by reference, the entire contents of which are incorporated herein by reference.

FIELD

Embodiments described herein relate generally to a pattern recognition device, a pattern recognition method, and a computer program product.

BACKGROUND

In a field of pattern recognition, a Hidden Markov model (HMM) as well as a Conditional Random Field and its derived forms have been widely used as a method for recognizing an input signal in which the break of a recognition unit is not clear such as a voice signal and a character string image. The above method can perform determination of the break of a recognition target and recognition of the recognition target at the same time, but requires a long calculation time to match the internal state models with feature vectors. Consequently a new technology capable of accurately and quickly recognizing an input signal in which the break of a recognition unit is not clear has been desired.

DETAILED DESCRIPTION

Figure 1A:
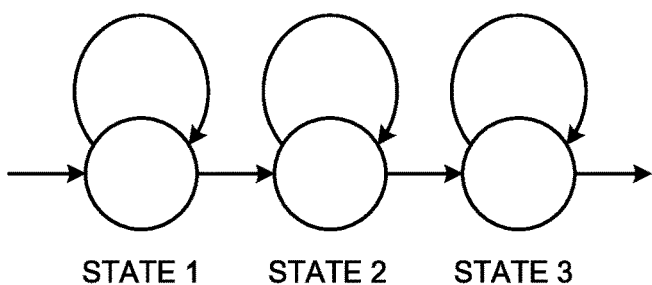
FIGS. 1A to 1D are schematic diagrams for explaining how to replace a state model of the HMM with a stochastic subspace model.

According to an embodiment, a pattern recognition device recognizes a pattern of an input signal by converting the input signal to a feature vector and matching the feature vector with a recognition dictionary. The recognition dictionary includes a dictionary subspace basis vector for expressing a dictionary subspace which is a subspace of a space of the feature vector, and a plurality of probability parameters for converting similarity calculated from the feature vector and the dictionary subspace into likelihood. The device includes a recognition unit configured to calculate the similarity using a quadratic polynomial of a value of an inner product of the feature vector and the dictionary subspace basis vector, and calculate the likelihood using the similarity and an exponential function of a linear sum of the probability parameters. The recognition dictionary is trained by using an expectation maximization method using a constraint condition between the probability parameters.

Hereinafter, embodiments of a pattern recognition device, a pattern recognition method, and a computer program will be described in detail with reference to the accompanying drawings.

First, the basic concept of the present embodiment will be described. In the conventional method that performs determination of the break of a recognition target and recognition of the recognition target at the same time, a long calculation time is required to match the internal state models with the feature vectors. In the present embodiment, to accurately and quickly recognize an input signal in which the break of a recognition unit is not clear, the matching calculation of the internal state models and the feature vectors that requires a long calculation time is replaced with a similarity calculation using a subspace method and its derived forms. The subspace method and its derived forms are known as methods for recognizing a single feature vector (see Reference 1 below), and have advantages of being able to accurately recognize an input signal relative to the processing time.

<Reference 1> E. Oja, "Pattern Recognition and Subspace Method", (translated by Hidemitsu Ogawa and Makoto Sato) Sangyo Tosho Publishing Co., Ltd., 1986

The object of the similarity calculation using the subspace method and its derived forms is the same as the object of the matching calculation of the state models with the feature vectors performed by the conventional method that performs determination of the break of a recognition target and recognition of the recognition target at the same time. Actually, the former can be regarded as an approximation of the latter (see Reference 2 below).

<Reference 2> Yoshiaki Kurosawa, "Subspace Method Obtained from Gaussian Distribution on a Hyper Spherical Surface", IEICE (D-2), J81-D2 (6), pp. 1205-1212, 1998

Thus, a model in which a probability parameter for converting the similarity in the former into a probability measure such as likelihood used in the latter is introduced, and for calculating likelihood L (x) of a feature vector x as the following formula (1) will now be considered.

$$L(x)=q\ \exp(-wx^T P'x)=\exp(\log q - wx^T P'x) \quad (1)$$

P' in the formula (1) is a matrix to be calculated by the following formula (2) from dictionary subspace basis vectors $u_1, \ldots, u_k$ that are orthonormal, and q and w are probability parameters.

$$P'=I-(u_1\ldots u_k)(u_1\ldots u_k)^T \quad (2)$$

In this example, s in the following formula (3) is similarity of the feature vector x.

$$s=1-wx^T P'x \quad (3)$$

In the following, a model for calculating the formula (1) is referred to as a "stochastic subspace model".

Figure 1B:
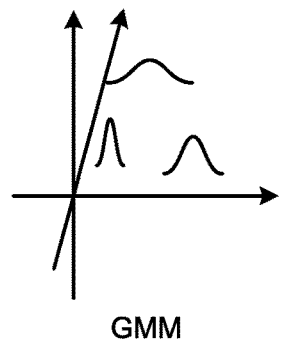

An example of replacing a state model of a Hidden Markov model (HMM) with a stochastic subspace model will now be described with reference to FIGS. 1A to 1D. As schematically illustrated in FIG. 1A, the HMM has a plurality of states. A series of feature vectors are input to the HMM. Each of the states is a statistic model of a single feature vector, and in a normal state, a Gaussian Mixture Model (GMM) as schematically illustrated in FIG. 1B is used (see Non-Patent Literature 1). In the HMM training, the parameter of the state and the parameter between the states are trained independently.

Figure 1C:
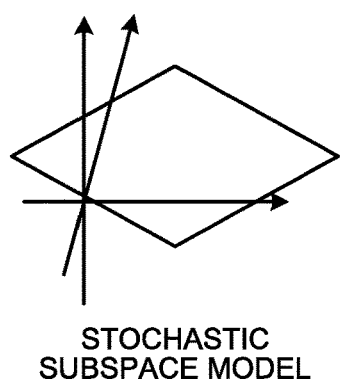
Figure 1D:
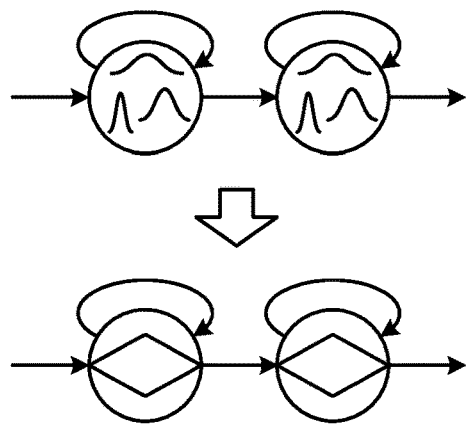

The GMM used as the state model of the HMM requires a large amount of calculation in proportion to the recognition accuracy, as the model for the single feature vector. Thus, the GMM that is usually used as the state model of the HMM is replaced with the stochastic subspace model as schematically illustrated in FIG. 1C. In the stochastic subspace model, the amount of calculation is smaller than that in the GMM, because calculation is performed in a subspace with the number of dimensions smaller than the number of dimension of the feature vector. Hence, as illustrated in FIG. 1d, the GMM used as the state model of the HMM is replaced with the stochastic subspace model to perform the matching calculation of the feature vectors. Consequently, it is possible to recognize an input signal accurately and quickly.

Viterbi algorithm for calculating the likelihood of the HMM does not depend on the method of calculating the likelihood of the state models, in recognizing the input signal (see C. M. Bishop, "Pattern Recognition and Machine Learning (vol. 1 and vol. 2)" (supervised and translated by Noboru Murata), Springer Japan, 2007, hereinafter referred to as "Non-Patent Literature 1"). Thus, it is possible to use the Viterbi algorithm as it is, even if the state model of the HMM is replaced with the stochastic subspace model.

Similar to Baum-Welch algorithm (see Non-Patent Literature 1) that uses the expectation-maximization (EM) method used in the HMM training, when the EM method is used in the stochastic subspace model training, the responsibility (see Non-Patent Literature 1) applied to each of the states does not depend on the form of the state model. Consequently, a similar calculation to that of the Baum-Welch algorithm can be performed.

Hence, the probability parameters q and w that are parameters of the stochastic subspace model and the dictionary subspace basis vectors $u_1, \ldots,$ and $u_k$ are to be updated using learning data $x_1, \ldots,$ and $x_N$. In this process, when the responsibilities of the learning data $x_1, \ldots,$ and $x_n$ are assumed as $\gamma_1, \ldots,$ and $\gamma_n$, the logarithmic likelihood of the entire learning data can be expressed as the following formula (4) by assuming the independence of the learning data.

$$L(q, w, P' \mid X) = \sum_n \gamma_n l(x_n) = -w\left[\sum_n \gamma_n x_n^T P' x_n\right] + \log q\left(\sum_n \gamma_n\right) \quad (4)$$

$$(l(x) := \log L(x), X := (x_1, \ldots, x_N))$$

In the EM method, the parameters are maximized so as to maximize the logarithmic likelihood expressed by the formula (4). As for P', similar to that in the principal component analysis (see Non-Patent Literature 1), the dictionary subspace basis vectors $u_1, \ldots,$ and $u_k$ can be obtained by diagonalizing the following formula (5), and sequentially taking the eigenvectors corresponding to the top k pieces of eigenvalues.

$$K := \sum_n \gamma_n x_n x_n^T \quad (5)$$

However, a problem occurs with respect to the probability parameters q and w. As is apparent from the form of the formula (6) described later, the data likelihood L is monotonic with respect to the probability parameters q and w, and it is not possible to maximize the data likelihood L with respect to the probability parameters q and w. Actually, if w is made small or q is made large, L can be arbitrarily increased, and this is not suitable as a recognition model.

Thus, in the present embodiment, a suitable constraint condition f(q, w)=0 is introduced between the probability parameters q and w. Consequently, the stochastic subspace model can be properly trained. In this manner, a new method of replacing the state model of the HMM and the like with the stochastic subspace model can implement a pattern recognition device capable of accurately and quickly recognizing an input signal in which the break of a recognition unit is not clear.

Figure 2:
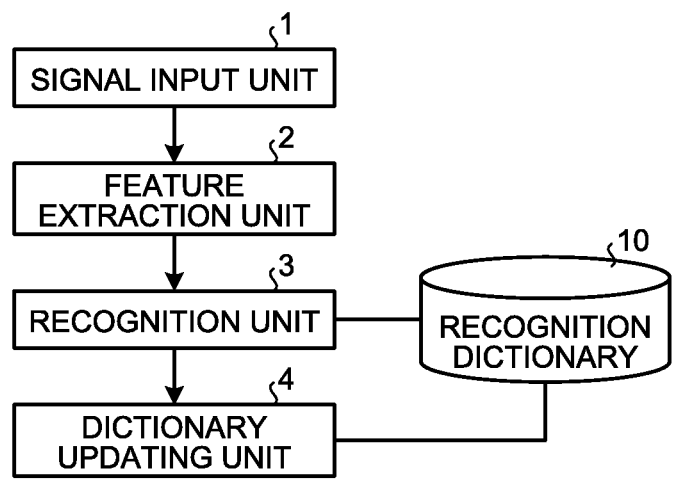
FIG. 2 is a block diagram illustrating a functional configuration of a pattern recognition device of an embodiment.

FIG. 2 is a block diagram illustrating a functional configuration of the pattern recognition device of the present embodiment. As illustrated in FIG. 2, the pattern recognition device of the present embodiment includes a signal input unit 1, a feature extraction unit 2, a recognition unit 3, and a dictionary updating unit 4.

The signal input unit 1 receives an input of a signal to be recognized. For example, the signal to be recognized is a character or a character string expressed as an image, the other images, a voice signal expressed as a waveform, various sensor signals, or the like. Digital information thereof or digital information having been subjected to preprocessing such as binarization according to the needs is supplied to the signal input unit 1.

The feature extraction unit 2 converts the signal input to the signal input unit 1 into a set of feature vectors with a certain number of dimensions. More specifically, the feature extraction unit 2 first performs windowing on the signals input to the signal input unit 1, and extracts partial signals within the area of the window. Next, the feature extraction unit 2 performs preprocessing such as normalizing the length and quantization level on each of the extracted partial signals. The feature extraction unit 2 then outputs feature vectors the components of which are the values having been subjected to the preprocessing or the values further having been subjected to a filter process such as the Gaussian filter or a conversion process such as the Fourier conversion after the preprocessing, to generate a set of feature vectors corresponding to the signal input to the signal input unit 1. More specifically, the technology disclosed in the following Reference 3 may be used.

<Reference 3> J. A. Rodriguez and F. Perronnin, "Local Gradient Histogram Features for Word Spotting in Unconstrained Handwritten Documents", Proc. ICFHR2008, 2008

The recognition unit 3 evaluates the set of feature vectors generated by the feature extraction unit 2 using a recognition dictionary 10, and outputs a recognition result indicating a class or a set of classes to which the signal input to the signal input unit 1 belongs.

The recognition dictionary 10 is a database including models respectively corresponding to the classes that are treated as classification destinations of the signals by the pattern recognition device of the present embodiment. The recognition dictionary 10 is stored inside or outside the pattern recognition device of the present embodiment. The model of each class stored in the recognition dictionary 10 is configured by a plurality of states like the HMM, and each of the states is the stochastic subspace model described above. In other words, the recognition dictionary 10 stores therein the dictionary subspace basis vectors $u_1, \ldots,$ and $u_k$ and the probability parameters q and w that correspond to each of the states of the model of each class. The dictionary subspace basis vectors $u_1, \ldots,$ and $u_k$ are parameters for expressing a dictionary subspace with the number of dimensions smaller than those of the feature vectors. The probability parameters q and w are parameters for converting the similarity calculated from the feature vectors and the dictionary subspace into likelihood.

The recognition unit 3 combines the models included in the recognition dictionary 10, searches for the optimum correspondence with the set of feature vectors generated by the feature extraction unit 2, and outputs a set of labels of the models. In this process, in each state of each model included in the recognition dictionary 10, the recognition unit 3 calculates the similarity for one or a plurality of feature vectors in the set of feature vectors, using a quadratic polynomial of the value of the inner product of the feature vector and the dictionary subspace basis vectors $u_1, \ldots,$ and $u_k$. The recognition unit 3 then calculates likelihood using the similarity and an exponential function of a linear sum of the probability parameters q and w. The recognition unit 3 then selects a combination of the models with which the overall data likelihood L is maximum, and outputs the set of labels of the models.

The data likelihood L is obtained by the following formula (6), when elements $x_1, \ldots,$ and $x_T$ of the set of feature vectors correspond to models $M_1, \ldots,$ and $M_T$ having dictionary subspaces $U_1, \ldots,$ and $U_T$, respectively.

$$L = \sum_p \gamma_t l(x_t) = \log P(M_1, \ldots, M_T) - w\left[\sum_t \gamma_t x_t^T P_t' x_t\right] + \log q\left(\sum_t \gamma_t\right) \quad (6)$$

$$(P_t' = I - U_t U_t^T)$$

In this process, probability $P(M_1, \ldots,$ and $M_T)$ that the model columns are $M_1, \ldots,$ and $M_T$ can be determined by the stochastic language model such as an N-gram (see Reference 4 below), and in a normal state, is trained by the Baum-Welch algorithm using bigram (see Non-Patent Literature 1).

<Reference 4> Kenji Kita, "Stochastic Language Model" (Language and Calculation 5), University of Tokyo Press, 1999

When the process by the recognition unit 3 is finished, the dictionary updating unit 4 updates the recognition dictionary 10 by using the set of feature vectors generated from the input signal. At this time, the dictionary updating unit 4 trains the recognition dictionary 10, by an expectation maximization method using the constraint condition f(q, w)=0 between the probability parameters q and w. Hereinafter, a specific example of a method of updating the recognition dictionary 10 will be described.

When the feature vectors that are input to a certain state model are assumed as $x_1, \ldots,$ and $x_N$, and the responsibilities are assumed as $\gamma_1, \ldots,$ and $\gamma_N$, the following formula (7) is first calculated. Then, the dictionary subspace basis vectors in the state model are updated, by assuming that the eigenvectors corresponding to the top k pieces of eigenvalues are $u_1, \ldots,$ and $u_k$.

$$K := \sum_n \gamma_n x_n x_n^T \quad (7)$$

With respect to the constraint condition f(q, w)=0 between the probability parameters q and w, a solution of an equation expressed by the following formula (8) is assumed as q, and a solution obtained by substituting the solution into f(q, w)=0 is assumed as w.

$$-\frac{\partial f}{\partial w} = \mu q \frac{\partial f}{\partial q} \quad (8)$$

Herein, μ is a weighted average obtained by subtracting the similarity at the time of recognition from one, and is expressed by the following formula (9).

$$\mu = \frac{\sum_n \gamma_n x_n^T P' x_n}{\sum_n \gamma_n} \quad (9)$$

For example, the constraint condition between the probability parameters q and w includes a condition to keep the intrinsic dimensionality of the state model expressed by the following formula (10) constant, in other words, a condition expressed by the following formula (11).

$$E := \frac{2\log q}{\log w - \log \pi} \quad (10)$$

$$f(q, w) = \frac{2\log q}{\log w - \log \pi} - E \quad (11)$$

In this process, the above formula (8) becomes the following formula (12), in other words, E/2w=μ, and w=E/2μ is obtained therefrom.

$$\frac{\log q}{w(\log w - \log \pi)} = \mu \quad (12)$$

Moreover, the following formula (13) is obtained by substituting w=E/2μ into the above formula (10). The probability parameters q and w are updated using these values.

$$q = \frac{E}{2}\log \frac{E}{2\pi\mu} \quad (13)$$

The dictionary updating unit 4 updates the dictionary subspace basis vectors $u_1, \ldots,$ and $u_k$ and the probability parameters q and w as described above, for each of the state models used for recognition performed by the recognition unit 3. In this manner, the recognition dictionary 10 is automatically trained every time the input signal is recognized, thereby improving the recognition accuracy.

Figure 3:
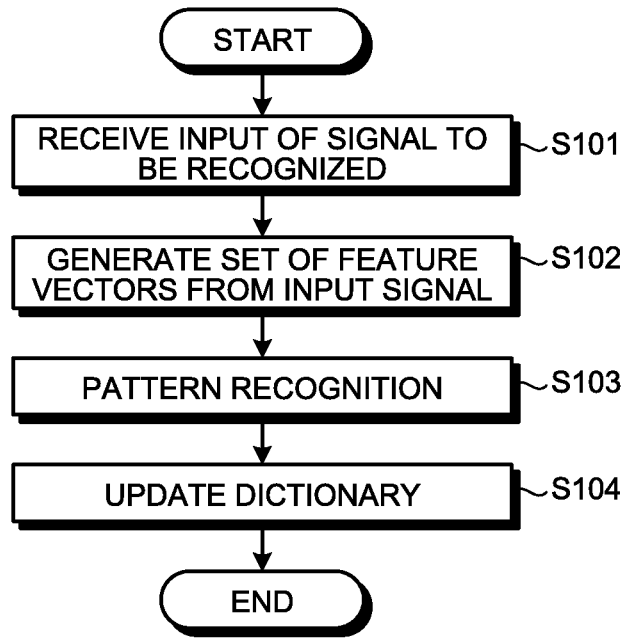
FIG. 3 is a flow chart illustrating an example of a processing procedure performed by the pattern recognition device of the embodiment.

Next, an overview of a process performed by the pattern recognition device of the present embodiment will be described with reference to FIG. 3. FIG. 3 is a flow chart illustrating an example of a processing procedure performed by the pattern recognition device of the present embodiment.

First, the signal input unit 1 receives an input of a signal to be recognized (step S101). The signal input to the signal input unit 1 is passed to the feature extraction unit 2.

Next, the feature extraction unit 2 receives the signal input at step S101 from the signal input unit 1, and generates a set of feature vectors from the signal, using the method described above (step S102). The set of feature vectors generated by the feature extraction unit 2 is passed to the recognition unit 3.

Next, the recognition unit 3 receives the set of feature vectors generated at step S102 from the feature extraction unit 2, evaluates the set of feature vectors using the recognition dictionary 10, and outputs the recognition result indicating the class or a set of the classes in which the signal input at step S101 belongs (step S103). In this process, the recognition unit 3 calculates the similarity and the likelihood of the feature vectors described above, for each state of the models included in the recognition dictionary 10, selects a combination of the models with which the overall data likelihood L is maximum, and outputs the set of labels. When the recognition process is finished, the set of feature vectors input to the recognition unit 3 and the set of labels output from the recognition unit 3 are passed to the dictionary updating unit 4.

Next, the dictionary updating unit 4 receives the set of feature vectors input to the recognition unit 3 and the set of labels output by the recognition unit 3, and updates the dictionary subspace basis vectors and the probability parameters for the state models used for recognition performed by the recognition unit 3, using the method described above (step S104). At this time, the constraint condition between the probability parameters described above is particularly used to update the probability parameters.

As described above using specific examples, in the pattern recognition device of the present embodiment, the stochastic subspace model described above is used as the state model of the model in each of the classes. The recognition dictionary 10 stores therein the dictionary subspace basis vectors and the probability parameters that correspond to each of the state models. With the set of feature vectors generated from the input signal, the recognition unit 3 calculates the similarity using the quadratic polynomial of the value of the inner product of the respective feature vectors and the respective dictionary subspace basis vectors. The recognition unit 3 then calculates likelihood using the obtained similarity and the exponential function of the linear sum of the probability parameters. The recognition unit 3 then selects the combination of the models with which the overall data likelihood is maximum, and outputs the set of labels thereof as the recognition result. When the process by the recognition unit 3 is finished, the dictionary updating unit 4 updates the recognition dictionary 10 using the set of feature vectors generated from the input signal. At this time, the dictionary updating unit 4 trains the recognition dictionary 10 by using the expectation maximization method using the constraint condition between the probability parameters. Consequently, the pattern recognition device of the present embodiment can accurately and quickly recognize an input signal in which the break of the recognition unit is not clear.

In the above explanation, the constraint condition between the probability parameters is a condition to keep the intrinsic dimensionality of the state model constant. However, available constraint condition is not limited thereto. For example, the constraint condition may be a condition to keep the following formula (14) constant, in each of the states of the model, in other words, using a condition expressed by the following formula (15).

$$p:=-w \log q \qquad (14)$$

$$f(q,w)=w \log q+p \qquad (15)$$

In this process, the above formula (8) develops to the following formula (16). When the formula (16) is substituted into the above formula (14), the following formula (17) can be obtained. The probability parameters q and w are updated by using the obtained values.

$$-\log q = w\mu \qquad (16)$$

$$w = \sqrt{\frac{p}{\mu}} \qquad (17)$$

Moreover, in the above explanation, the state model of the HMM is replaced with the stochastic subspace model expressed by the formula (1). However, it is not limited thereto. The model that takes time to calculate the likelihood in the other method that performs determination of the break of a recognition target and recognition of the recognition target at the same time, may be replaced with the stochastic subspace model. Furthermore, instead of using the stochastic subspace model expressed by the formula (1), a model that has the similar functions, in other words, the other model for calculating the similarity using the subspace method and for calculating likelihood from the similarity, may be used.

Still furthermore, in the above explanation, the dictionary updating unit 4 is provided inside the pattern recognition device. However, the dictionary updating unit 4 may also be provided outside the pattern recognition device. In this case, for example, the dictionary updating unit 4 provided outside the pattern recognition device updates the recognition dictionary 10 described above, while communicating with the pattern recognition device.

Figure 4:
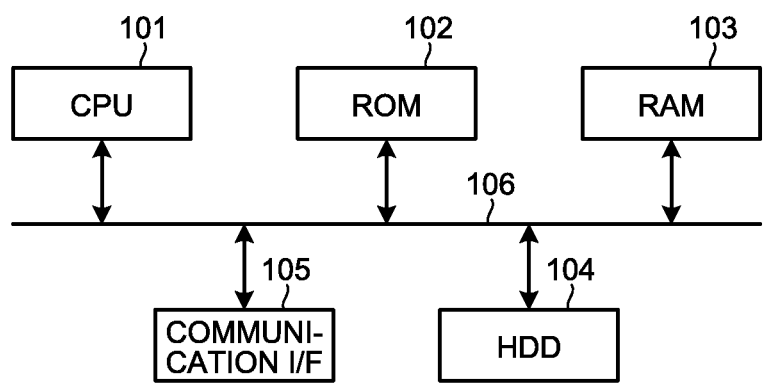
FIG. 4 is a block diagram illustrating an example of a hardware configuration of the pattern recognition device of the embodiment.

The pattern recognition device of the present embodiment, for example, as illustrated in FIG. 4, can have a hardware configuration using a normal computer including a processor such as a central processing unit (CPU) 101, a storage device such as a read only memory (ROM) 102 and a random access memory (RAM) 103, an auxiliary storage device such as a hard disk drive (HDD) 104, a communication interface (I/F) 105 that performs communication by connecting to a network, a bus 106 that connects the units, and the like. In this case, the functional components described above may be implemented by executing a predetermined pattern recognition program on a computer.

The pattern recognition program is provided as a computer program product by being recorded on a computer readable recording medium such as a compact disc read-only memory (CD-ROM), a flexible disk (FD), a compact disc recordable (CD-R), a digital versatile disc (DVD), and the like in an installable or executable file format.

Moreover, the pattern recognition program may be stored on the other computer connected to a network such as the Internet, and provided by being downloaded via the network. The pattern recognition program may also be provided or distributed via the network such as the Internet.

Furthermore, the pattern recognition program may be incorporated into the ROM 102 or the like in advance.

The pattern recognition program has a modular configuration including the processing units (signal input unit 1, feature extraction unit 2, recognition unit 3, and dictionary updating unit 4) of the pattern recognition device of the present embodiment, and as an actual hardware, for example, the above processing units are loaded on the RAM 103 (main storage) and are generated on the RAM 103 (main storage), when the CPU 101 (processor) reads out the computer program from the above storage medium and executes the computer program. Moreover, in the pattern recognition device of the present embodiment, a part or all of the above processing units may be implemented using dedicated hardware such as an application specific integrated circuit (ASIC) and a field-programmable gate array (FPGA).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A pattern recognition device that recognizes a pattern of an input signal by converting the input signal to a feature vector and matching the feature vector with a recognition dictionary, wherein
the recognition dictionary includes a dictionary subspace basis vector for expressing a dictionary subspace which is a subspace of a space of the feature vector, and a plurality of probability parameters for converting similarity calculated from the feature vector and the dictionary subspace into likelihood,
the device comprising:
processing circuitry configured to function as a recognition unit configured to calculate the similarity using a quadratic polynomial of a value of an inner product of the feature vector and the dictionary subspace basis vector, and calculate the likelihood using the similarity and an exponential function of a linear sum of the probability parameters, wherein
the recognition dictionary is trained by using an expectation maximization method using a constraint condition between the probability parameters.

2. The device according to claim 1, wherein the processing circuitry is further configured to function as a dictionary updating unit configured to train the recognition dictionary by using an expectation maximization method using the constraint condition between the probability parameters.

3. The device according to claim 1, wherein
the recognition dictionary includes, for each class, a model configured by a plurality of states, each of the states of the model corresponding to the probability parameters and the dictionary subspace basis vector, and
the recognition unit calculates the similarity and the likelihood of one or a plurality of the feature vectors, for each of the states of the model.

4. The device according to claim 3, wherein the constraint condition is a condition to keep intrinsic dimensionality of the state corresponding to the probability parameters constant.

5. A pattern recognition method executed by a pattern recognition device that recognizes a pattern of an input signal by converting the input signal to a feature vector and matching the feature vector with a recognition dictionary, wherein
the recognition dictionary includes a dictionary subspace basis vector for expressing a dictionary subspace which is a subspace of a space of the feature vector, and a plurality of probability parameters for converting similarity calculated from the feature vector and the dictionary subspace into likelihood, the method comprising:
calculating the similarity using a quadratic polynomial of a value of an inner product of the feature vector and the dictionary subspace basis vector; and
calculating the likelihood using the similarity and an exponential function of a linear sum of the probability parameters, wherein
the recognition dictionary is trained by using an expectation maximization method using a constraint condition between the probability parameters.

6. A computer program product comprising a non-transitory computer-readable medium including programmed instructions that cause a computer to function as a pattern recognition device configured to recognize a pattern of an input signal by converting the input signal to a feature vector and matching the feature vector with a recognition dictionary, wherein
the recognition dictionary includes a dictionary subspace basis vector for expressing a dictionary subspace which is a subspace of a space of the feature vector, and a plurality of probability parameters for converting similarity calculated from the feature vector and the dictionary subspace into likelihood, the instructions causing the computer to execute:
calculating the similarity using a quadratic polynomial of a value of an inner product of the feature vector and the dictionary subspace basis vector; and
calculating the likelihood using the similarity and an exponential function of a linear sum of the probability parameters, wherein
the recognition dictionary is trained by using an expectation maximization method using a constraint condition between the probability parameters.

* * * * *